United States Patent [19]
Zieske

[11] Patent Number: 5,950,975
[45] Date of Patent: Sep. 14, 1999

[54] ADJUSTABLE FENDER BRACKET

[76] Inventor: Robert L. Zieske, 6630 Calypte La., Loomis, Calif. 95659

[21] Appl. No.: 09/020,808

[22] Filed: Feb. 9, 1998

Related U.S. Application Data

[63] Continuation-in-part of application No. 08/388,669, Feb. 9, 1995, abandoned.

[51] Int. Cl.[6] .................................................. E04G 3/00
[52] U.S. Cl. .................................... 248/291.1; 248/316.1; 280/847; 280/848; 280/154
[58] Field of Search .............................. 248/230.5, 285.1, 248/286.1, 291.1, 316.1, 442.2, 674, 282.1, 284.1, 289.11; 280/154, 847, 854, 848; 296/198

[56] References Cited

U.S. PATENT DOCUMENTS

| | | |
|---|---|---|
| 817,203 | 4/1906 | Thompson .............................. 280/154 |
| 1,094,134 | 4/1914 | Dickerson ................................ 280/154 |
| 1,458,457 | 6/1923 | Amez-Droz .......................... 248/442.2 |
| 1,543,808 | 6/1925 | Turnmire ............................ 280/847 X |
| 2,530,857 | 11/1950 | Campbell ................................ 280/847 |
| 3,897,722 | 8/1975 | Harris ................................ 248/282.1 X |
| 5,511,808 | 4/1996 | Rowland ............................ 280/847 X |
| 5,839,743 | 11/1998 | Weinkauf ................................ 280/848 |

FOREIGN PATENT DOCUMENTS 314238   6/1929   United Kingdom ................ 248/291.1

*Primary Examiner*—Leslie A. Braun
*Assistant Examiner*—Gwendolyn Baxter
*Attorney, Agent, or Firm*—Lothrop & West

[57] ABSTRACT

A bracket for supporting a fender on a frame including an arm and a plate. The arm is bent to form two parallel, but displaced portions. The plate is attached to the outer portion using a clamp. The clamp can be loosened to allow the plate to rotate about and slide along the outer end of the arm. A bolt extends from and parallel to the inner portion of the arm. The bolt passes through a hole in the frame and can rotate in the hole until a nut secures the bracket.

18 Claims, 3 Drawing Sheets

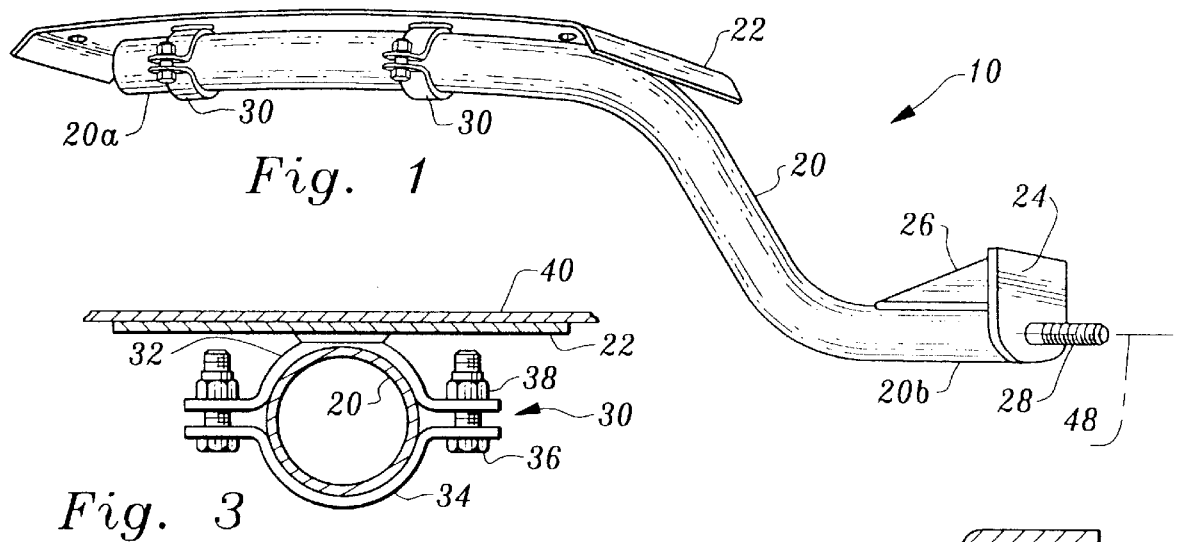
Fig. 1
Fig. 3
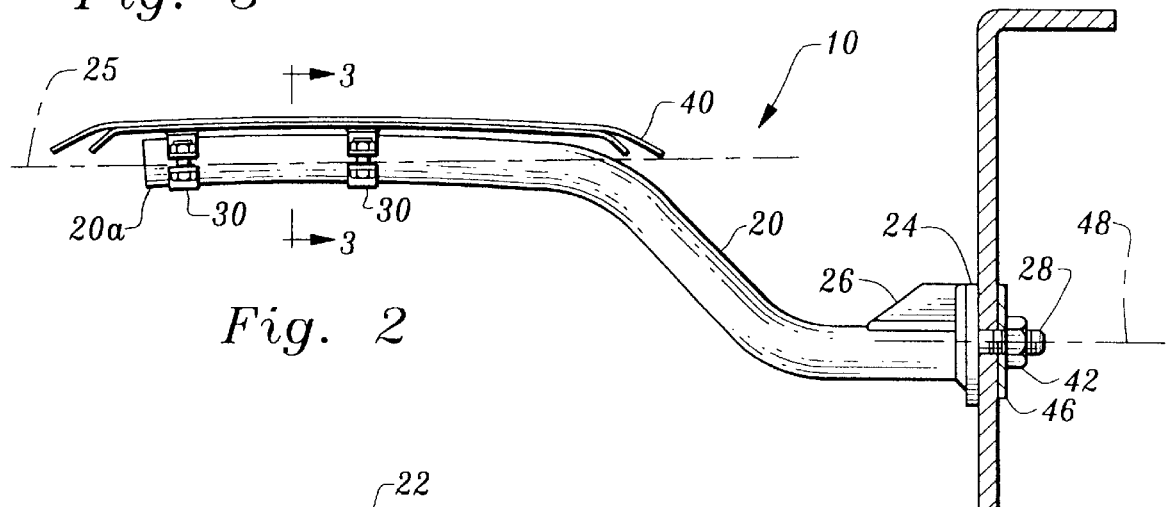
Fig. 2
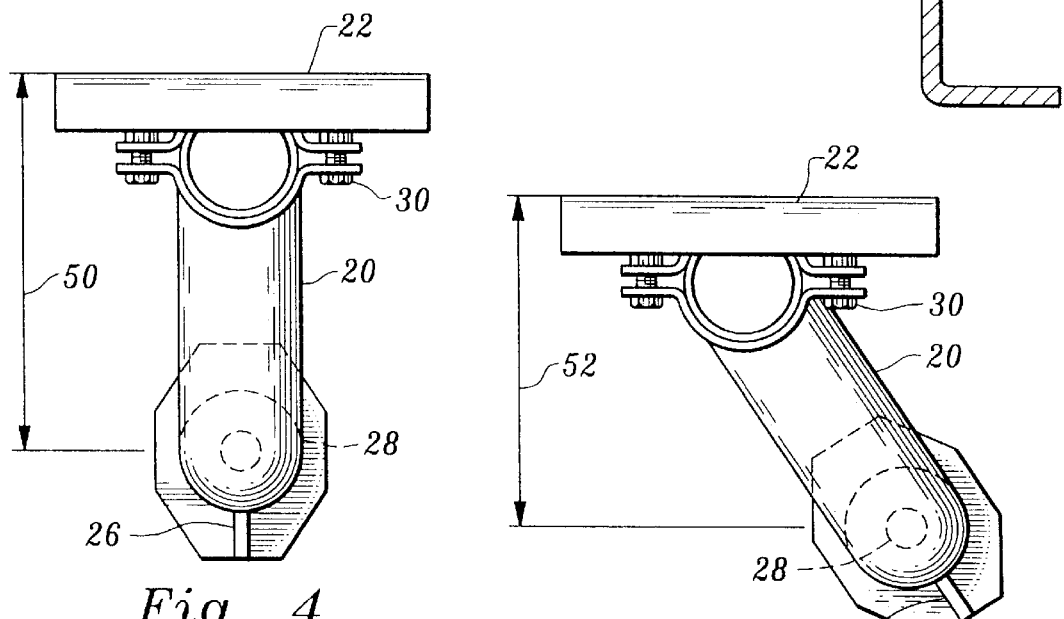
Fig. 4
Fig. 5

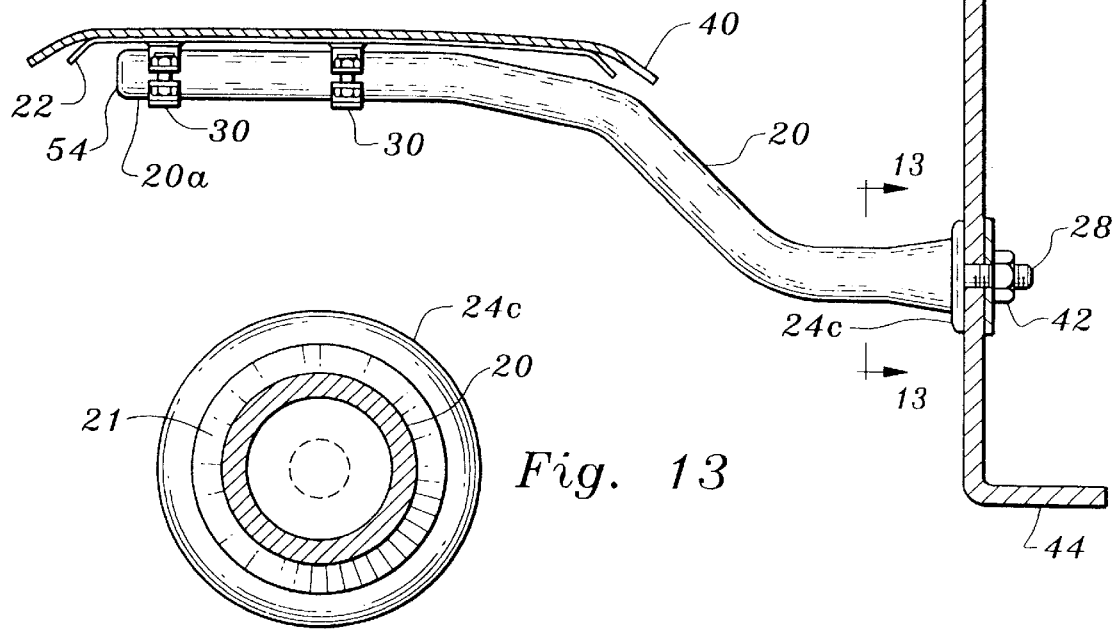
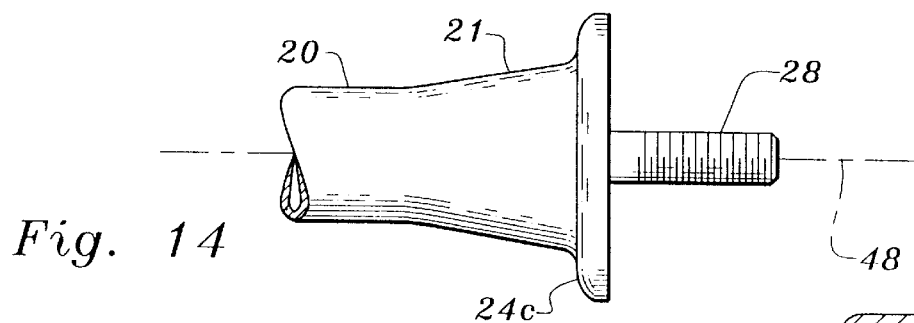
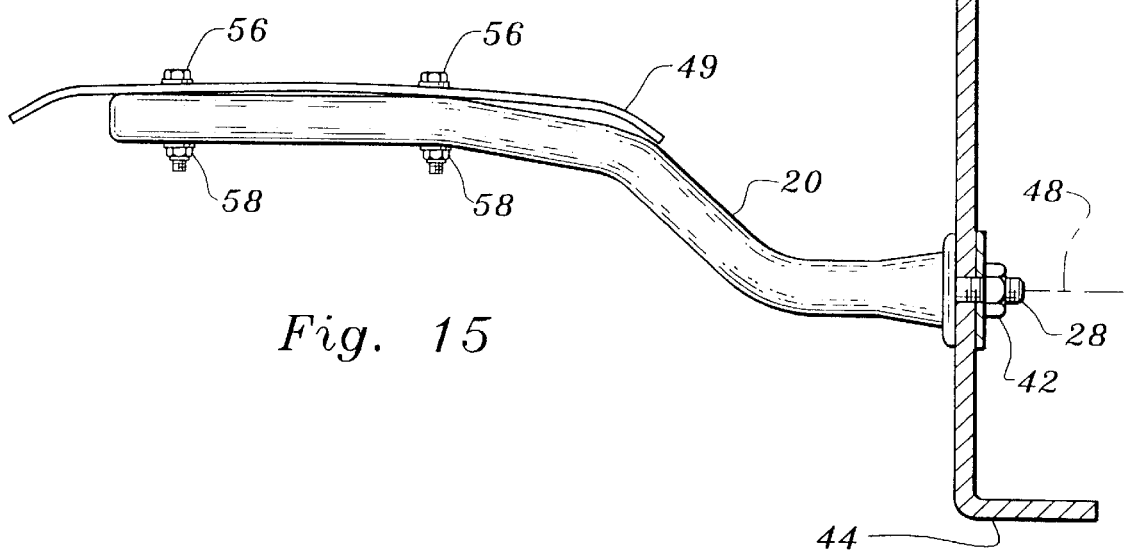

ADJUSTABLE FENDER BRACKET

CROSS-REFERENCE TO RELATED APPLICATIONS

This application is a continuation-in-part of application Ser. No. 08/388,669, filed Feb. 9, 1995, for "ADJUSTABLE FENDER BRACKET," now abandoned.

STATEMENT REGARDING FEDERALLY SPONSORED RESEARCH OR DEVELOPMENT

Not Applicable.

BACKGROUND OF THE INVENTION (1) Field of the Invention

The invention relates generally to fender support brackets, and more particularly to fender support brackets that are adjustable in height and extension to allow their use on various trucks with various fenders.

(2) Description of Related Art Including Information Discovered Under 37 CFR 1.97 and 37 CFR 1.978

Trucks and semi tractor-trailer vehicles have fenders partially surrounding their wheels to prevent spray, rocks, and other road debris from flying into adjacent lanes and oncoming traffic.

Various supports and brackets have been used to hold fenders in place with varying amounts of success. A fender support that has no adjustability must be precisely positioned on a truck's frame. Otherwise a supported fender will be placed in continual stress. After miles of travel-induced vibrations, this stress can cause the fender to crack and ultimately break.

Some vehicles use quarter fenders placed in front and above a wheel. Typical fender supports attach to the top of such quarter fenders. The junction of the support and the fender forms a ledge that can trap gravel, rocks, or other foreign objects. These objects may not be jarred loose until the truck is traveling at speed on a highway, where they may fall off and bounce into the window of an adjacent car.

What is needed is a fender support bracket that is adjustable, allowing it to be used on a variety of trucks and fenders, and which can be used on quarter fenders without trapping road debris.

BRIEF SUMMARY OF THE INVENTION

It is therefore an object of the present invention to provide a fender support bracket that supports a fender in a relaxed position, preventing the fender from binding, cracking, flexing, or "oil canning."

It is another object of the present invention to provide a fender support bracket that has adjustable height and length. As an advantage, the fender can be mounted without binding.

It is another object to provide a fender support bracket that can support one-half fenders and one-quarter fenders.

It is still another object to provide a fender support that mounts under the fender. This provides the advantage of not providing a ledge for rocks and other road debris to collect.

According to the present invention, the foregoing and other objects and advantages are attained by a bracket that includes as its two major components an arm and a plate. The arm is bent such that its outer end is offset from its inner end, thereby providing a height offset.

The plate may be moved along the arm and rotated around the arm.

These and other features, advantages, and objects of the present invention will become apparent to those skilled in the art upon examination of the following specification when taken in conjunction with the drawings.

BRIEF DESCRIPTION OF THE SEVERAL VIEWS OF THE DRAWING

FIG. 1 is a perspective view of an adjustable fender support bracket according to the present invention.

FIG. 2 is a side elevation view of the bracket of FIG. 1 showing a fender and a portion of a truck frame in a cross section.

FIG. 3 is a cross-sectional view taken alone the line 3—3 of FIG. 2.

FIGS. 4 and 5 are elevation views, taken from the outer end of the bracket in two alternative orientations, showing two different fender-to-frame heights.

FIG. 12 is a side elevational view of another adjustable fender support bracket according to the present invention.

FIG. 13 is a cross sectional view of the bracket, taken along line 13—13 of FIG. 12.

FIG. 14 is an enlarged side elevation view of a portion of the bracket of FIG. 12.

FIG. 15 is a side elevational view of the bracket of FIG. 12, in which the fender is mounted directly to the arm.

DETAILED DESCRIPTION OF THE INVENTION

Figure 6:
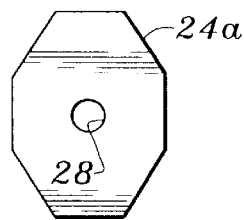
FIGS. 6 through 8 are elevation views, taken from the inner end, of alternatively-shaped frame mounts.

Referring now to the drawings, and initially to FIGS. 1 and 2, an adjustable fender support bracket 10 according to the present invention comprises two main components: an arm 20 and a plate 22.

Arm 20 includes an outer end 20a, having a first longitudinal axis 25, and an inner end 20b, having a second longitudinal axis 48. A frame mount 24 is located at inner end 20b, and is strengthened by a gusset 26. The arm, the frame mount 24, and the gusset 26 are welded together. A threaded mounting bolt 28 extends from the frame mount 24, coincident with the second longitudinal axis 48. The center portion of the arm 20 is bent such that the first longitudinal axis 25 of the outer end is offset from and substantially parallel to the second longitudinal axis 48 of the inner end.

The plate 22 is attached to the arm 20 by a pair of clamps 30. Referring now to FIG. 3, each clamp 30 comprises an upper strap 32 and a lower strap 34. The plate is welded to the to to the top of the upper strap. The upper strap and the lower strap surround the arm 20. A pair of bolts 36 and nuts 38 force the outer ends of the straps towards each other, causing the clamp to securely grip the arm and thereby secure the plate to the arm.

Referring again to FIG. 2, the plate 22 supports a fender 40. The plate forms a slight curve, thereby forcing a similar curve in the fender. The curve gives the fender strength transverse to the curve and prevents the fender from flexing or "oil canning."

The mounting bolt 28 attached to the inner end 20b of the arm 20 passes through a hole in the frame 44 and is secured in place with a nut 42 and washer 46. Prior to the tightening of the nut on the bolt, the fender support 10 is free to pivot around the axis 48 of the bolt.

The arm 20 shown in the drawings is constructed from a circular tube having a constant cross-sectional radius. When the nuts 38 and bolts 36 are loosened, the clamps 30 and thus the plate 22 can rotate around the arm. Furthermore, when the clamps are loosened, they can move longitudinally along the length of the arm 20.

Referring now to FIGS. 4 and 5, the arm 20 can be mounted in a vertical orientation resulting in a first vertical distance 50 between the plate 22 and the bolt 28. Alternatively, the arm 20 can be rotated as shown in FIG. 5 to decrease the vertical distance 52 between the plate 22 and the bolt 28. The clamp 30 can be adjusted to keep the plane of the plate 22 horizontal. In this manner, the fender support bracket 10 can be adjusted to firmly support the fender 40, and yet not place the fender under stress.

Figure 7:
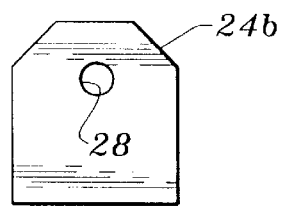
Figure 8:
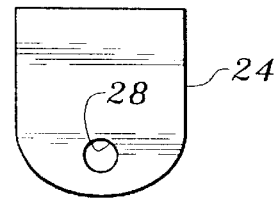

Referring now to FIGS. 6–8, the frame mount 24 can assume various configurations. In FIG. 6, frame mount 24a is generally rectangular in elevation, with squared-off corners. In FIG. 7, frame mount 24b is generally rectangular in elevation, with squared-off upper corners. And, in FIG. 8, frame mount 24 is generally U-shaped in elevation. The different configurations allow the fender support bracket 10 to be mounted to different truck frames 44 while avoiding any obstructions that may be on the frame.

Figure 9:
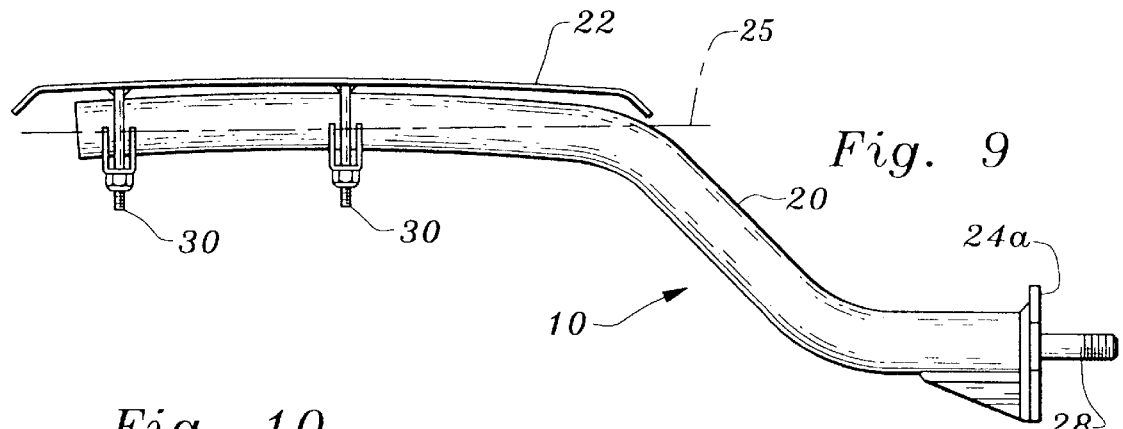
FIG. 9 is a side elevational view of another adjustable fender support bracket according to the present invention.

Referring now to FIG. 9, a fender support bracket 10 may use a different type of clamp 30 to attach the plate 22 to the arm 20. The clamps shown in FIG. 9 are of the type of clamp commonly used to attach mufflers to exhaust pipes in automobiles.

Figure 10:
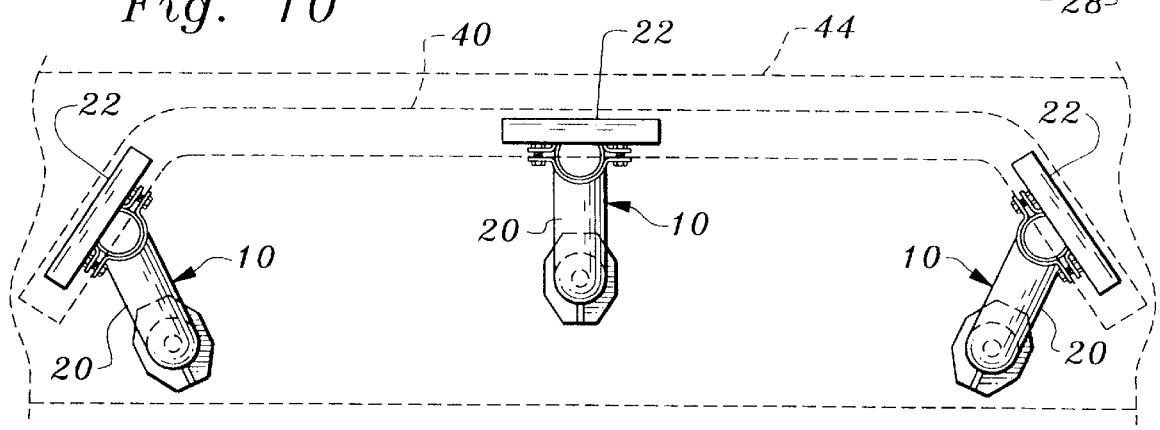
FIG. 10 is an elevation view of three brackets according to the present invention supporting a fender, with the fender and the truck frame shown in broken line.

Referring now to FIG. 10, three fender support brackets 10 according to the present invention can be used to support a standard fender 40. One bracket supports the middle section of the fender while two more brackets support the ends of the fender. The angles of the arms 20 and the plates 22 are independently adjustable to conform to the shape and height of the fender relative to the frame 44. The plates can move along their respective arms to vary the distance of the fender from the frame.

Figure 11:
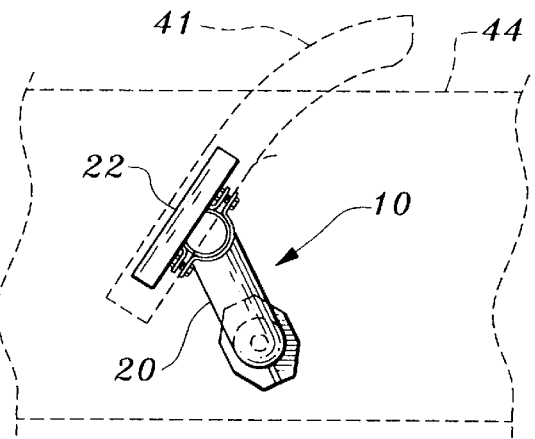
FIG. 11 is an elevation view of a bracket according to the present invention supporting a quarter fender, with the fender and the truck frame shown in broken line.

Referring to FIG. 11, a single fender support bracket 10 can also be used to support a quarter fender 41. The angles of the arm 20 and of the plate can be adjusted to move the fender into the appropriate height, angle, and distance from the wheels (not shown).

Referring now to FIGS. 12–14, another adjustable fender bracket according to the present invention uses swedging to attach the arm 20 to the frame mount 24c. The swedging process creates an expanded section 21 of the arm 20, adjacent the frame mount 24c. As best seen in FIG. 13, the frame mount 24c is circular in shape. In a preferred embodiment, a hard plastic end cap 54 fits into and seals the outer end 20a of the arm.

As for the adjustable fender bracket shown in FIGS. 1–11, a curved plate 22 forces a curve in the fender 40, preventing it from flexing or "oil canning."

Referring now to FIG. 15, the fender 40 can be attached directly to the arm 20 by bolts 56 and nuts 58. When using this method of attachment, the arm 20 is attached to the frame 44 using the mounting bolt 28 and securing nut 42. The arm can be rotated around the second longitudinal axis 48 of the bolt to adjust the vertical position of the outer end 20a of the arm 20. The fender 40 is then placed on the arm where it is to be attached and holes are drilled through the arm for the bolts 56.

The fender brackets discussed above are described and shown having a tubular arm with a circular cross section. Skilled workers will recognize that other shapes and configurations of arms could be used provided that the clamps allow their plates to rotate around the arm.

Likewise, the fender brackets discussed above are described and shown having a tubular arm with a constant diameter cross section. Skilled workers will recognize that other shapes and configurations of arms could be used provided that the plate can move longitudinally along the arm.

The fender support brackets shown in the drawings have a mounting bolt attached to the frame mount. Skilled workers will recognize that other means of attaching the support bracket to a frame that allow the arm to rotate around the point of attachment can also be used. One example of such an attachment means is a drilled, tapped hole in the frame mount. A separate mounting bolt would pass through a hole in the frame to thread to the threaded hole in the frame mount.

The terms and expressions which have been employed in the foregoing specification are used therein as terms of description and not of limitation, and there is no intention, in the use of such terms and expressions, of excluding equivalents of the features shown and described or portions thereof, it being recognized the scope of the invention is defined and limited only by the claims which follow.

What is claimed is:

1. A bracket for supporting a fender on a frame, comprising:
   (a) an elongate arm having an inner end and an outer end, said arm being bent such that a first longitudinal axis of said outer end is offset in substantially parallel relation from a second longitudinal axis of said inner end;
   (b) means for mounting said inner end to the frame in different rotational positions about said second longitudinal axis, to establish a selected vertical distance between said longitudinal axes; and,
   (c) a plate attached to said outer end of said arm such that said plate can rotate about said arm, said plate being adapted to support the fender.

2. The bracket of claim 1, wherein said means for mounting comprises a threaded bolt attached to said inner end of said arm.

3. The bracket of claim 1, further comprising a clamp, and wherein said plate is attached to said arm by said clamp.

4. The bracket of claim 1, wherein said plate forms a curve about an axis transverse to said first longitudinal axis of said outer end of said arm.

5. The bracket of claim 1, wherein said plate can be moved longitudinally along said first longitudinal axis of said outer end of said arm.

6. A bracket for supporting a fender on a frame, comprising:
   (a) an elongate arm having an inner end and an outer end, said arm being bent such that a first substantially horizontal longitudinal axis of said outer end is offset from and substantially parallel to a second substantially horizontal longitudinal axis of said inner end;
   (b) a plate, said plate being adapted to support the fender;
   (c) a clamp securing said plate to said outer end of said arm, said clamp being adjustable to support said plate in a plurality of different alternative angles of rotation about said first longitudinal axis of said outer end of said arm and in a plurality of positions along said first longitudinal axis of said outer end of said arm, and;

(d) a mount adapted to secure said inner end of said arm to the frame, said mount allowing said arm to be mounted at different angles of rotation about said second longitudinal axis of said inner end.

7. The bracket of claim 6, wherein said outer end of said elongate arm has a constant-diameter circular cross-sectional portion.

8. The bracket of claim 7, wherein said clamp capable of being loosened to rotate and slide along said constant-diameter circular cross-sectional portion.

9. The bracket of claim 6, wherein said plate forms a curve about an axis transverse to said first longitudinal axis of said outer end of said arm.

10. The bracket of claim 6, wherein said mount includes a mounting plate orthogonal to said second longitudinal axis of said inner end of said arm.

11. The bracket of claim 10, wherein said mount further includes a bolt having an axis coincident with said second longitudinal axis of said inner end of said arm.

12. The bracket of claim 6, wherein said elongate arm is fabricated from a length of circular tubing having a constant diameter.

13. A bracket for supporting a fender on a frame of a truck, said bracket comprising:

(a) a tubular arm having an inner end and an outer end, said arm being bent such that a first substantially horizontal longitudinal axis of said outer end is offset from a second substantially horizontal longitudinal axis of said inner end;

(b) a plate, said plate being adapted to support the fender;

(c) a clamp securing said plate on said outer end of said tubular arm; and, (d) a mount adapted to secure said inner end of said arm to the frame, said mount allowing said arm to be mounted at different angles of rotation about said second longitudinal axis of said inner end.

14. The bracket of claim 13, in which said clamp allows said plate to be mounted at different angles of rotation with respect to said first longitudinal axis and at different locations along said outer end.

15. The bracket of claim 13, wherein said plate forms a curve about an axis transverse to said longitudinal axis of said outer end of said tubular arm.

16. A bracket for supporting a fender on a frame, comprising:

(a) an elongate arm having an inner end and an outer end, said arm being bent such that a first substantially horizontal longitudinal axis of said outer end is offset in substantially parallel relation from a second substantially horizontal axis of said inner end, a fender being supported by said outer end of said arm; and, (b) means for orienting said inner end in different rotational positions about said second longitudinal axis, to establish a selected vertical distance between said longitudinal axes.

17. The bracket as in claim 16 in which the fender is directly attached to said outer end of said arm with at least one nut and bolt.

18. The bracket as in claim 17 in which the arm is first rotated into a rotational position to establish said selected vertical distance, and then a bolt hole is drilled through both the fender and said outer end of said arm.

* * * * *